(12) United States Patent
Dow (10) Patent No.: US 11,034,126 B2
(45) Date of Patent: Jun. 15, 2021

(54) VISUALLY DYNAMIC MULTI-LAYER ELASTOMERIC MATERIALS

(71) Applicant: Eliot Dow, Chicago, IL (US)

(72) Inventor: Eliot Dow, Chicago, IL (US)

( * ) Notice: Subject to any disclaimer, the term of this patent is extended or adjusted under 35 U.S.C. 154(b) by 0 days.

(21) Appl. No.: 16/127,768

(22) Filed: Sep. 11, 2018

(65) Prior Publication Data

US 2020/0079048 A1 Mar. 12, 2020

(51) Int. Cl.

| | | |
|---|---|---|
| *B32B 3/18* | (2006.01) | |
| *B32B 1/08* | (2006.01) | |
| *B32B 7/02* | (2019.01) | |
| *B32B 7/08* | (2019.01) | |
| *A41D 31/02* | (2019.01) | |
| *A01K 27/00* | (2006.01) | |
| *B32B 25/04* | (2006.01) | |

(52) U.S. Cl.
CPC .............. *B32B 3/18* (2013.01); *A01K 27/003* (2013.01); *A41D 31/02* (2013.01); *B32B 1/08* (2013.01); *B32B 7/02* (2013.01); *B32B 7/08* (2013.01); *B32B 25/042* (2013.01); *A41D 2600/10* (2013.01); *B32B 2307/51* (2013.01); *B32B 2437/00* (2013.01)

(58) Field of Classification Search
CPC .. B32B 3/18; B32B 3/10; B32B 3/266; B32B 25/042; B32B 1/08; B32B 7/02; B32B 7/08; B32B 2437/00; B32B 2307/51; B32B 2307/404; B32B 2307/546; B32B 2307/726; B32B 5/04; B32B 5/26; B32B 27/32; B32B 27/12; B32B 2262/0253; B32B 2535/00; B32B 2264/104; B32B 2307/54; B32B 2555/00; B32B 2555/02; A01K 27/003; A41D 31/02; A41D 2600/10; A61F 13/49015; A61F 13/1902; A61F 13/84; A61F 2013/8497; G09F 3/0292; Y10T 442/659; Y10T 442/601; Y10T 442/494; Y10T 442/60; Y10T 442/3008; Y10T 442/3707; Y10T 442/413
See application file for complete search history.

(56) References Cited

U.S. PATENT DOCUMENTS

| | | |
|---|---|---|
| 3,069,796 A | 12/1962 | Ruter et al. |
| 3,497,415 A | 2/1970 | Adachi |
| 3,683,419 A | 8/1972 | Lewis |
| 5,347,658 A | 9/1994 | Clark |
| 5,486,385 A | 1/1996 | Bylund et al. |

(Continued)

*Primary Examiner* — Michael Zhang
(74) *Attorney, Agent, or Firm* — K&L Gates LLP (57) ABSTRACT

The present disclosure provides a multi-layer system including at least two or more parallel layers of thin material unconnected within a layer but joined together by at least two opposing edges that are in series with an anticipated vector of mechanical force. Each layer includes two or more materials of different elasticities that are arranged in series with respect to the two fixed ends of the material. Each layer can possess a unique spatial arrangement of the different elastic segments. The relative movement of the material layers provides patterns within one or more of the layers that reveal colors, spaces, or patterns in the underlying layers depending on the amount of tension across the material. This allows for the dynamic change in outward appearance of the material with the increase and decrease of force.

22 Claims, 9 Drawing Sheets

(56) References Cited

U.S. PATENT DOCUMENTS

| | | |
|---|---|---|
| 5,916,829 A | 6/1999 | Girard et al. |
| 6,125,472 A | 10/2000 | Nakagawa |
| 6,175,960 B1 | 1/2001 | Knittel |
| 6,255,236 B1 * | 7/2001 | Cree ...................... B32B 5/022 |
| | | 442/328 |
| 6,764,744 B2 | 7/2004 | DeMott et al. |
| 7,107,621 B2 | 9/2006 | Meekins |
| 7,153,789 B1 | 12/2006 | Hatjasalo et al. |
| 7,578,148 B2 | 8/2009 | McMurray |
| 8,084,078 B2 | 12/2011 | Burrell |
| 8,104,097 B2 | 1/2012 | Hamann |
| 9,241,516 B2 | 1/2016 | Sokolowski et al. |
| 9,420,837 B2 | 8/2016 | Pezzimenti |
| 9,587,913 B2 | 3/2017 | Williams et al. |
| 9,839,247 B2 | 12/2017 | Etheridge et al. |
| 2006/0246802 A1 * | 11/2006 | Hughes ................... B32B 3/10 |
| | | 442/327 |
| 2007/0298262 A1 | 12/2007 | Quiram et al. |
| 2008/0171959 A1 | 7/2008 | Achtelstetter |
| 2009/0178174 A1 | 7/2009 | Cash, Jr. |
| 2011/0086208 A1 | 4/2011 | Nemphos, Jr. et al. |
| 2012/0124714 A1 | 5/2012 | Hamann |
| 2013/0022794 A1 * | 1/2013 | Ng ....................... B32B 27/302 |
| | | 428/195.1 |
| 2013/0251962 A1 | 9/2013 | Reid, Jr. |
| 2014/0317823 A1 | 10/2014 | Hanson |
| 2015/0038042 A1 | 2/2015 | Erkus et al. |

\* cited by examiner

VISUALLY DYNAMIC MULTI-LAYER ELASTOMERIC MATERIALS

BACKGROUND OF THE INVENTION

The present subject matter relates generally to multi-layer elastomeric fabric materials. Specifically, the present subject matter provides visually dynamic multi-layer elastomeric fabric materials.

There are many applications in which a color changing material, and specifically a color changing fabric, may be valuable. For example, it may be valuable to use a material that indicates when a material is in an extended state (e.g., tension applied) or when a material is in an unextended state (e.g., no tension applied). In some applications, for example, in some medical matters, it may be valuable to visual identify when, and to what extent, a material has been deformed, stretched, extended. In other applications, a color changing fabric may be used for purely aesthetic purposes.

Materials, and specifically fabrics, that change their visual appearance have conventionally been color changing materials. There are numerous mechanisms for making a color changing material, including, for example, thermochromic materials, materials that change color when deformed (e.g., multilayer materials, single layer materials that change color under mechanical stress/strain, etc.), materials that change color in response to activation by exposure to another material (e.g., air, water, chemical, etc.), and so on.

Multi-layer materials have been used to create a visually dynamic materials by stretching one layer in relation to another. In a first example, color changing laminate materials have included at least two layers of extensible materials that, when stretched, expose a previously covered inner layer through a plurality of openings (for example, slits) in an outer layer that open when the material is stretched. Using different color materials for the inner layer and the outer layer, the color and pattern shown at the outer layer of the material may change based on the degree to which the material is stretched/unstretched. The color change can be used to provide a means of signaling extension, and/or degree of extension, by providing a distinctive visual cue.

In another example, a color changing fabric includes an elastic material that presents as a first color in an unstretched condition and changes to a different color when stretched. The fabric is made from a material including an outer layer comprising a covering fiber that is wrapped a number of turns about an inner fiber having a different color than the outer fiber. When the fabric is stretched, the turns of the outer layer move apart to expose the color of the inner layer underneath.

In another example, a three-layer stretchable material may be used to present a color changing fabric. For example, an outer layer may appear to be a different color depending on whether it is combined with an intermediate layer or an inner layer. The intermediate layer may block the visibility of the lower layer when the material is stretched and may allow the color of the lower layer to combine with the color of the top layer when the material is unstretched (or vice versa), thereby causing the outer layer to present as different colors when the material is stretched or unstretched.

Where extensible or elastic fabrics or materials are used, it can be beneficial to be able to readily perceive, by a visual cue or signal, when the material is, or has been, in an extended or stretched state. Attempts have been made to provide such a visual cue or signal that a certain event has occurred by developing materials that change color as a result of a particular trigger during the event. For example, a tamper-evident bottle or jar-cap seal uses encapsulated coloring agents, or stress whitening of the plastic in the tamper-evident cap seal, to indicate that the cap has been twisted, permanently deforming the seal material.

In still other examples, materials may include colorants that trigger upon activation by contact with water, or air, or other materials. For example, a chemical-laden nonwoven web material may be protected under an outer layer, such as a shrink wrap film. When the outer layer is breached, the chemical reacts with the ambient air to change color and indicate that the breach has occurred. However, these materials rely on chemicals or additives to react upon the triggering event, or, in the stress whitening embodiment of the tamper seal, rely on permanent deformation to permanently whiten the sears plastic.

However, for some applications (for example, materials that are intended to perform for more than a single use), it is important that the material is durable under the conditions for which it is intend, as the performance may degrade should the material become permanently deformed or discolored.

Therefore, there remains a need for new materials capable of visually indicating when the material is in an extended state, or when the material has previously been extended, and/or returned to its original state with coincident removal of the visual indicator. Furthermore, there remains a need for materials capable of indicating material extension without reliance on relatively expensive chemical color change additives, which chemicals may also be potentially unhealthful or have potentially environmentally deleterious effects.

Further, there is a need for fabric and other materials for use in consumer goods that offer a way for individuals to express themselves, draw attention for others, or receive visible feedback through the outward appearance of the product such as its color, text, pattern, or imagery that reacts dynamically in response to users' behaviors.

BRIEF SUMMARY OF THE INVENTION

The present disclosure provides materials that display a dynamic visual appearance when tension is applied across the material. An object of the system is to provide greater capacity for design that increases the utility, aesthetic value, and self-expression of consumer products. Various examples of the multi-layer materials are provided herein.

A primary embodiment of the disclosed system is a type of textile or other laminar material for garments, accessories, and other consumer goods. The material includes multiple layers, each having different elastic properties that create relative movement between layers in response to a user's behavior, for instance, when a wearer moves. The material layers possess design properties that create a dynamic aesthetic effect when the layers move relative to one another.

The present multi-layer system includes at least two or more parallel layers of thin, laminar material, substantially unconnected between layers, but notably joined together by at least two opposing edges that are perpendicular to an anticipated vector of mechanical force. The edges parallel to the anticipated vector of force can be free, sewn to adjacent material, bound loosely by strands of material, maintained on tracks, or otherwise joined to adjacent material. Each layer includes two or more materials of different elasticities (i.e., elastic segments) that are arranged in series with respect to the two fixed ends of the material. Each layer can possess a unique spatial arrangement of the different elastic segments. Consequently, a force applied across the plane of the multi-layered material will result in uniform overall tension across each layer of the material but result in differential relative movement for individual points across layers.

The relative movement of the material layers provides the movement of patterns of holes, spaces, transparencies, or other means of selective visibility in one or more of the layers which reveal colors, spaces, or patterns in the underlying layers depending on the amount of tension across the material. This allows for the dynamic change in outward appearance of the material with the increase and decrease of force.

A second example of the present multi-layer system includes at least two or more parallel layers of thin, laminar material, substantially unconnected between layers, but notably joined together by at least two opposing edges that are perpendicular to an anticipated vector of mechanical force. At least two layers have non-identical arrangements of elastic material comprised of various apertures in a grid-like pattern wherein the layers' apertures deform differently when stretched in at least one direction. The differential positioning of the apertures at rest and under tension produce a dynamic change in the outward appearance of the material with the increase and decrease of force.

The disclosure provides a multi-layer system comprising an outer layer including a first outer layer portion and a second outer layer portion, wherein the first outer layer segment has a different elasticity than the second outer layer segment; and an inner layer including a first inner layer segment and a second inner layer segment, wherein the first inner layer segment has a different elasticity than the second inner layer segment, wherein upon application of a mechanical force on the multilayer system, the outer layer and inner layer move relative to one another from a resting state to an extended state, wherein in the resting state a portion of the inner layer is not visible through the outer layer, wherein in the extended state the portion of the inner layer is visible through the outer layer.

In an example, the disclosure provides a multi-layer system comprising an outer elastic layer and an inner elastic layer wherein the inner and outer layers have non-identical arrangements of elastic material comprised of various apertures in a grid pattern and wherein the layers' apertures deform differently when stretched in at least one direction such that wherein in the resting state a portion of the inner layer is not visible through the outer layer, wherein in the extended state the portion of the inner layer is visible through the outer layer.

On one example, a multi-layer system includes: a first layer of material including an outer side and an inner side and a first layer first edge and a first layer second edge on opposing sides of the first layer of material; a second layer of material adjacent to the inner side of the first layer of material, the second layer of material including a second layer first edge and a second layer second edge on opposing sides of the second layer of material; the first layer first edge is connected to the second layer first edge and a first layer second edge is connected to the second layer second edge; the second layer of material is partially visible through the first layer of material and partially obscured by the first layer of material when viewed through the outer side of the first layer of material; in response to a tensile force applied along a first axis defined by a line spanning the first layer first edge and the first layer second edge, the first layer and the second layer move relative to each other from a first configuration to a second configuration; and different portions of the second layer of material are visible through the first layer of material when in the first position and in the second position.

In some examples, the first layer of material has a first modulus of elasticity and the second layer of material has a second modulus of elasticity, wherein the first modulus of elasticity and the second modulus of elasticity are not identical.

In other examples, the first layer of material includes at least a first segment and a second segment, wherein the first segment has a different modulus of elasticity than the second segment. In still more examples, the second layer of material includes at least a first segment and a second segment, wherein the first segment has a different modulus of elasticity than the second segment.

An advantage of the present system is providing dynamic visuals upon a user moving the materials.

A further advantage of the present system is providing a manner of self-expression.

A further advantage of the present system is providing a manner of novelty or visual surprise.

A further advantage of the present system is providing a manner of informational feedback to a user based on their interaction with the material.

A further advantage of the present system is providing the user with greater visibility and attention from others in the vicinity of the user.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIGS. 1A-1B are schematics of an example of the multi-layer system including three layers, wherein the layers include various elastic sections at various locations, wherein FIG. 1A is an example of the multi-layer system in a rest position, wherein

DETAILED DESCRIPTION OF THE INVENTION

The present multi-layer system includes at least two or more layers of thin, moveable material possessing specialized areas in the outer layer (apertures, areas of transparency, areas of low thread count, areas of low thread weight, lenticular lenses, etc.) through which the more inner layers are visible through the outer layers. At least two or more layers are comprised of zones of elasticity in series with an anticipated vector of mechanical force spatially arranged in non-identical ways to other layers. When tensile force is applied to the material, there is relative motion between two or more of the layers that results in visibility of some different portion of the inner layers through the outer layers. The result of the altered visibility of the layers arising from their relative movement is an outward visual change in the appearance of the material.

The multilayer system can include two or more layers of material including the layers being loosely joined or unconnected to other layers throughout the panel yet connected together by at least two opposing edges that are perpendicular to an anticipated vector of mechanical force. Each layer can include at least two zones of different elasticities and the zones are arranged in series with respect to the two fixed ends. The at least two layers can have a non-identical arrangement of the differential elastic zones.

Figure 1A:
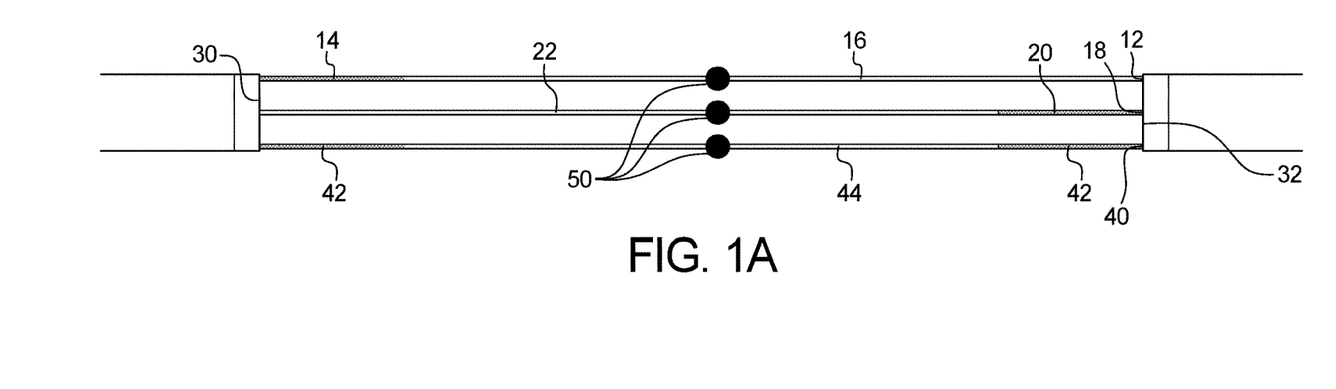
Figure 1B:
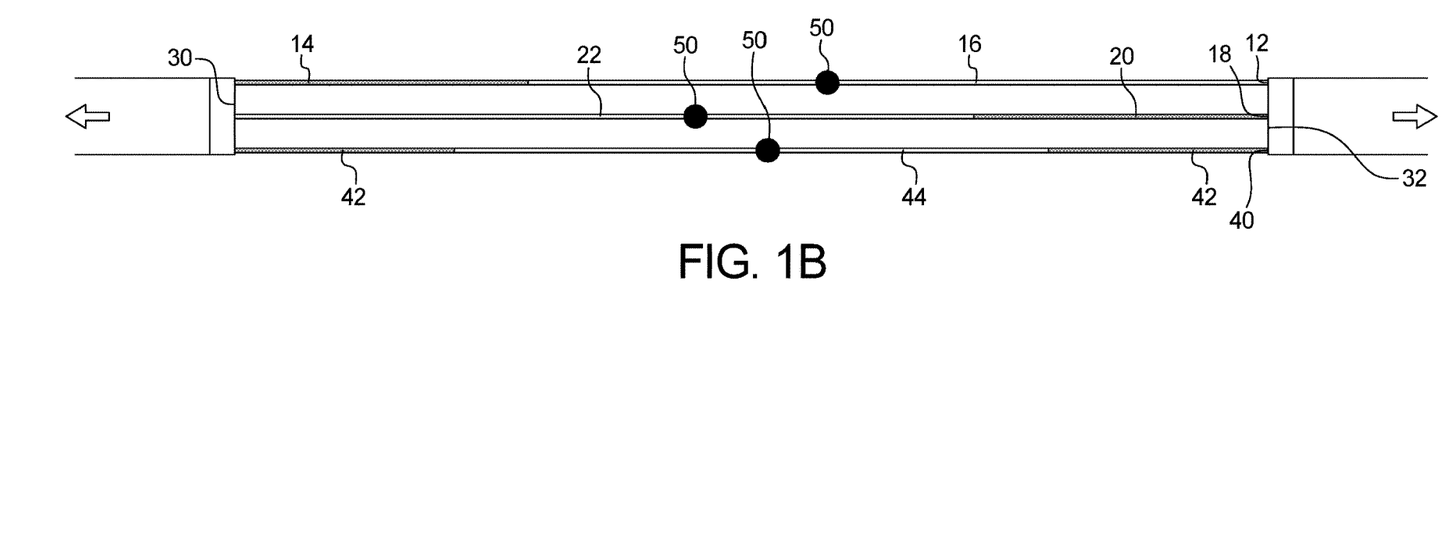
FIG. 1B is an example of the multi-layer system under mechanical force

The edges parallel to the anticipated vector force (e.g., orthogonal to the connected edges) can be free, sewn to adjacent material, bound loosely by strands of material, maintained on tracks, and/or otherwise joined to adjacent material. Consequently, a tensile force applied across the plane of the multi-layered material of a vector in line with the opposing connected edges can result in uniform overall tension across each layer of the material but differential relative movement for individual points across layers, as shown in FIGS. 1A-1B. Precise arrangement of the specialized areas in the outer layer (and other layers) reveal different areas of the underlying layers as the layers undergo relative movement.

As shown in FIG. 1A, the multi-layer system 10 can include a first layer 12 having at least two segments having different elasticities. For example, a first layer 12 can include a first segment 14 that has an elastic modulus of X and the second segment 16 can have an elastic modulus of 2X, 10X, or 200X, among others. The second layer 18 (e.g., inner layer) can include a first segment 20 of the second layer 18 that has an elastic modulus of X and the second segment 22 of the second layer 18 can have an elastic modulus of 2X, 10X, or 200X, among others, wherein the first segment 14 of the first layer 12 is positioned in a different location than the first segment 20 of the second layer 18. As shown in FIG. 1A, the first segment 14 of the first layer is at a first end 30, wherein the first segment 20 of the second layer 18 is at a second end 32. The multi-layer system 10 can also include a third layer 40 including two first segments 42, located at opposite ends, and a second middle segment 44, wherein the first segments 42 have an elastic modulus of X and the second segment 44 can have an elastic modulus of 2X, 10X, or 200X, among others. As shown in FIG. 1A, when no force is applied and the material is at rest, the relative point 50 in each layer is aligned.

In FIG. 1B, the multi-layer system 10 is under translational mechanical force as indicated by the arrow. As shown, based on the various elasticities of the different segments of the different layers, the relative points 50 of the different layers are no longer aligned. As a result, a different visual representation can be achieved wherein the relative point 50 in the second layer 18 and the relative point 50 in the third layer 40 are no longer hidden underneath the relative point 50 in the first layer 12. Thus, under mechanical force, the relative midpoints in the second layer 18 and third layer 40 can be seen.

Although the example in FIGS. 1A-1B illustrates parallel movement, the system can include various arrangements. For example, the arrangement of elastic elements and connected seams can produce relative linear motion between layers in more than one axis, non-uniform movement, or to accommodate multiple modes of force. The arrangement of elastic elements and connected seams can be arranged to produce relative rotation between layers. Yet another arrangement can include multiple discrete segments of the construction in series comprising a larger whole body. The layers can be arranged in cylindrical loops such that each layer attaches back on itself to close its free edge. In another example, the areas of differential elasticity arising from the combination of different materials or arising from differential zones of elasticity within a single fabrication. In another example, one or more of the thin, laminar layers can be replaced with a thick, non-laminar layer covered by a thin outer layer. This may include a solid inner cylinder surrounded by an outer thin laminar layer.

Figure 2A:
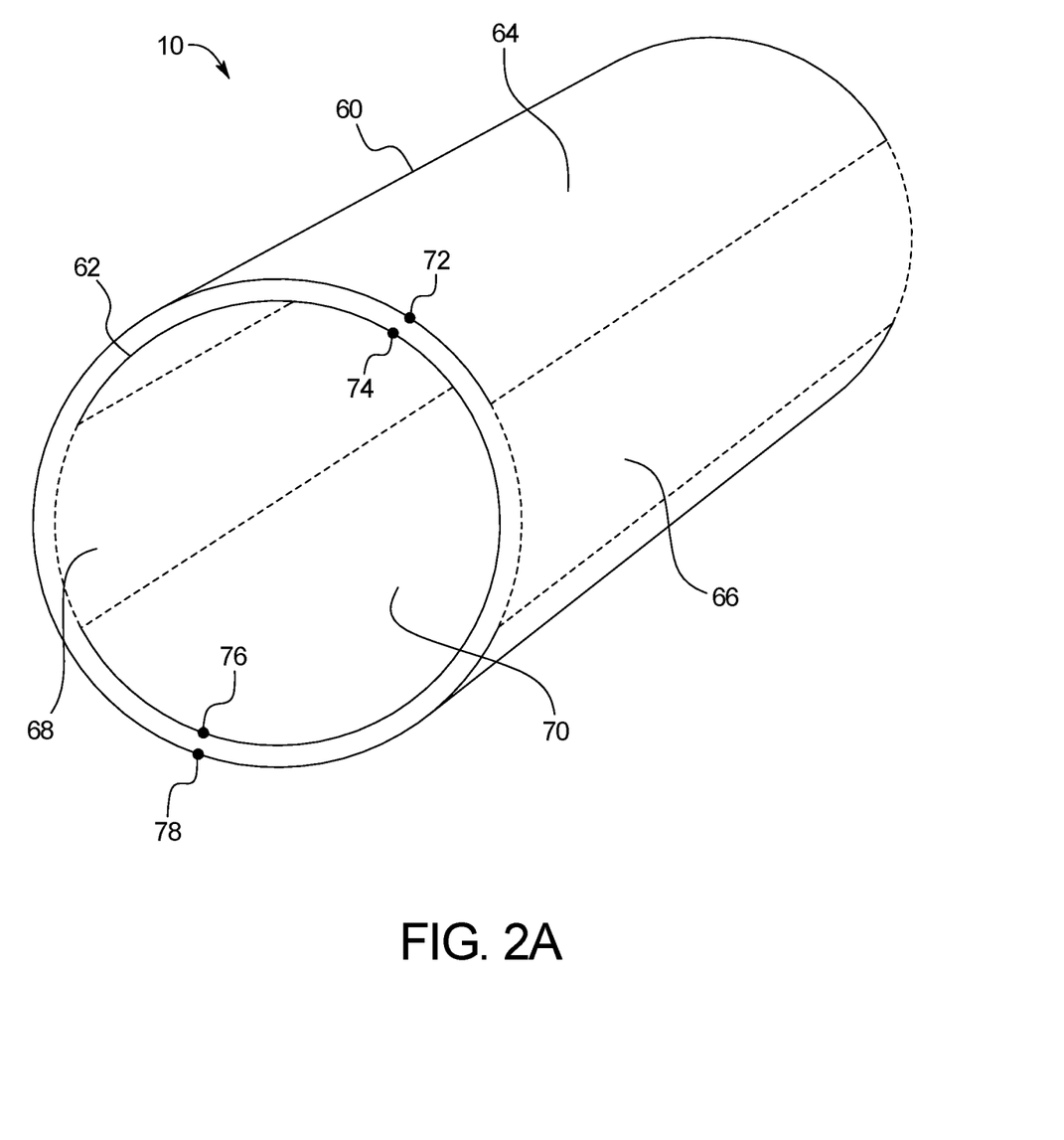
FIG. 2A is a perspective view of an example of the multi-layer system in a cylindrical configuration.
Figure 2B:
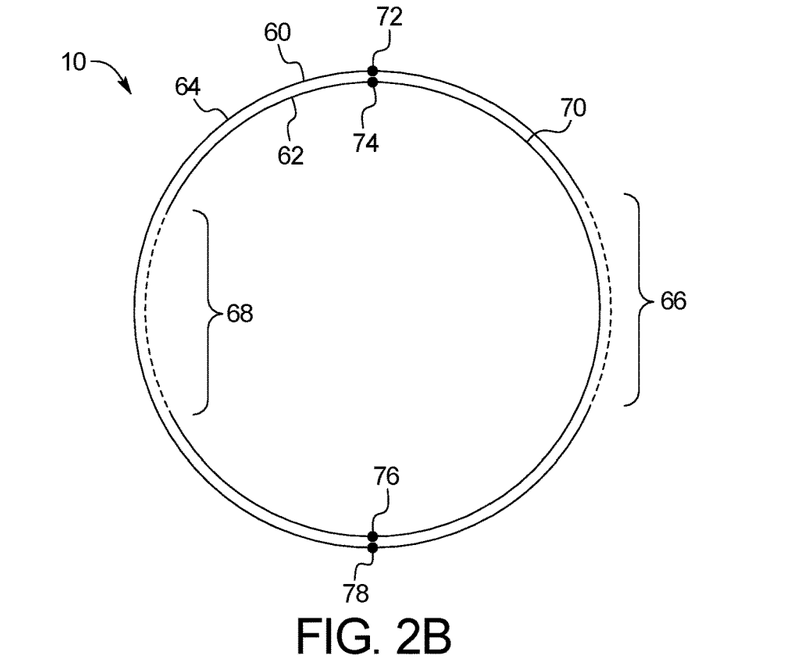
FIG. 2B is a cross-section view of an example of the multi-layer system in a cylindrical configuration at rest.
Figure 2C:
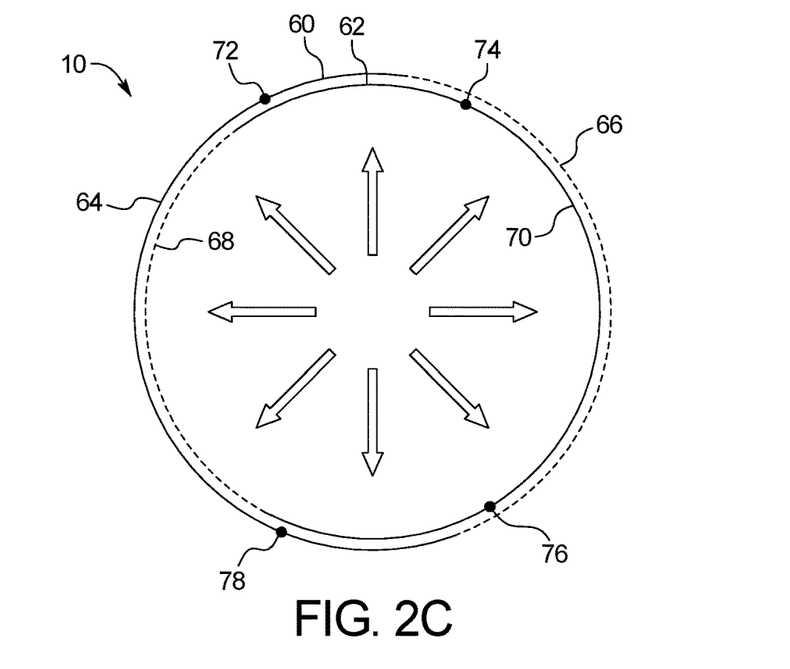
FIG. 2C is a cross-section view of an example of the multi-layer system in a cylindrical configuration under force.

For example, as shown in FIGS. 2A-2C, the multi-layer system 10 can be arranged in which the layers are created as cylinders with their free edges being joined to themselves. Alternatively, or in addition to, the layers can be loosely joined or unconnected to other layers throughout the plane but being connected together by at least two opposing edges at the two ends of the cylinder. Further, each layer can include at least two zones of different elasticities and the zones are arranged in parallel to the long axis of the cylinder. The at least two layers can have a non-identical arrangement of the differential elastic zones. Consequently, radial or circumferential force to the cylinder will produce relative movement of the layers. Precise arrangement of the specialized areas in the outer layer (and underlying layers) reveal different areas of the underlying layers as the layers undergo relative movement.

The arrangement of the cylindrical embodiments can include connected seams so as to produce non-uniform relative movement among layers or to accommodate multiple modes of force. The arrangement of elastic elements and connected seams can produce relative rotational motion between layers and/or translational movement. Multiple discrete segments of the construction in series can comprise a larger whole piece of the apparel or item. The areas of differential elasticity can arise from the combination of different materials or from differential zones of elasticity within a single fabrication.

As shown in FIGS. 2A-2B, the multi-layer system 10 can include an outer cylindrical fabric piece 60 and an inner cylindrical fabric piece 62. The outer cylindrical fabric piece 60 can include a first segment 64 and a second segment 66, wherein the first segment 64 has a different elasticity than that of the second segment 66. The inner cylindrical fabric piece 62 can include a first segment 68 and a second segment 70, wherein the first segment 68 has a different elasticity than that of the second segment 70. As shown in FIGS. 2A-2B, when no mechanical force is applied relative point 72 on the outer cylindrical fabric piece 60 is aligned with the relative point 74 of the inner cylindrical fabric piece 62, and the relative point 76 of the inner cylindrical fabric piece 62 is aligned with the relative point 78 of the outer cylindrical fabric piece 60.

As shown in FIG. 2C, when an outward mechanical force is applied to the cylindrically arranged fabrics, due to the difference in elasticities between the different segments of the inner and outer cylindrical fabric pieces, the relative points are no longer aligned. Therefore, in an example, under mechanical force, relative point 74 is no longer hidden by relative point 72, therefore, relative point 74 can be seen only during mechanical force application. Similarly, under mechanical force, relative point 76 is no longer hidden by relative point 78, therefore, relative point 76' can be seen only during mechanical force application.

In an example, the multi-layered system can be configured wherein the layers are loosely joined or unconnected to other layers throughout a panel but being connected together by at least two opposing edges that are in series with an anticipated vector of mechanical force. The layers can be comprised of a uniform composition of elastic material, wherein at least two layers are comprised of non-identical compositions of elastic material that contains various apertures that deform when force is applied. The at least two layers can have various non-identical arrangements of apertures that deform in non-identical manners when force is applied. In an example, the two layers of material have various apertures that deform differently when force is applied across the plane of the material such that the material bordering the aperture moves relative to that of another layer. The apertures in the two or more layers can form a pattern of constructive or destructive interference that changes as the materials deform from applied tension, as shown in FIGS. 3A-3B.

Figure 3A:
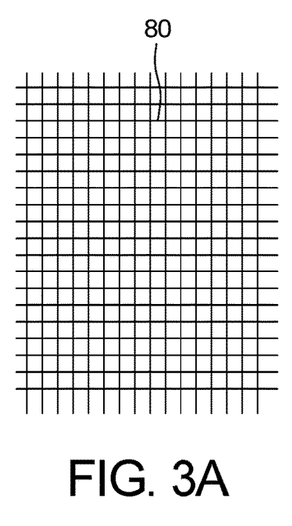
FIGS. 3A-3C are front views of material 1, material 2, and overlapping materials 1 and 2, respectively, at rest.
Figure 3B:
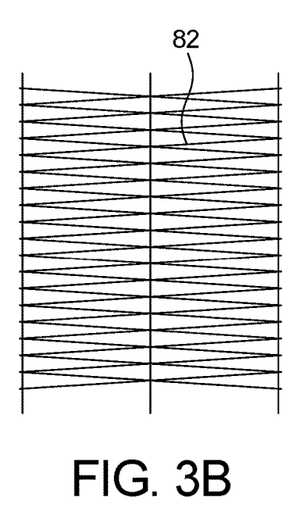
Figure 3C:
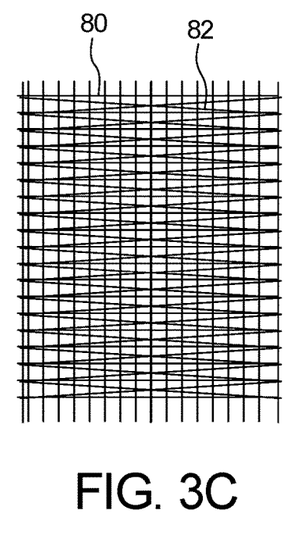
Figure 3D:
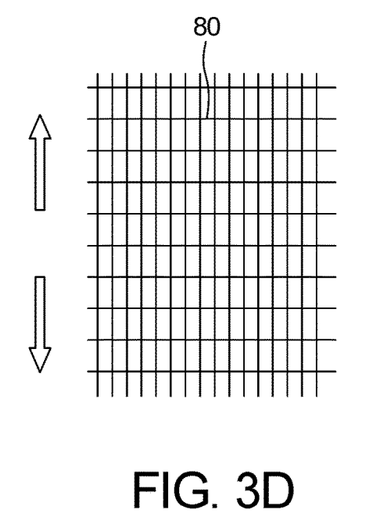
FIG. 3D-3F are front views of material 1, material 2, and overlapping materials 1 and 2, respectively, under force.
Figure 3E:
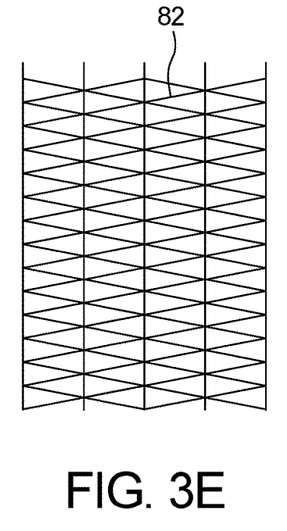
Figure 3F:
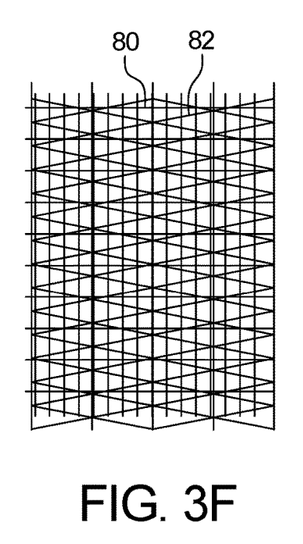

Specifically, FIG. 3A depicts a first material 80 and FIG. 3B depicts a second material 82, wherein FIG. 3C depicts the overlap of the first material 80 and second material 82. Further, FIG. 3D depicts the first material 80 under tensile force. FIG. 3E depicts the second material 82 under tensile force. FIG. 3F depicts the overlap of the first material 80 and second material 82 under tensile strength.

The relative movement of the material layers provide dynamic designs. For example, patterns of holes, spaces, transparency, or other zones in one layer that reveal selected areas in layers beneath can produce changes in color, images, text, or patterns in the outward appearance of the material. Coupling the relative movement of the layers to a person's actions (e.g., flexing limbs while wearing the apparel, pulling on it, standing upon it) results in dynamically changing appearance of a product whose design corresponds to user behavior.

In an example, a Moiré pattern can be used that involves two or more layers made up of various repeating opaque and transparent geometric patterns that when overlaid produce a third pattern arising from the layers' patterns of interference. Moiré patterns are often viewed as an unexpected nuisance in graphic design and electronics. However, Moiré patterns can also be designed to produce intriguing and aesthetically meaningful patterns both static and dynamic. The layers can be constructed to as to produce text, images, and symbols, as well as a moving imagery in the form of barrier-grid animation also known as a kinegram.

An enhancement of aesthetic value of the material is the capability of change in colors upon application of various tension forces. For example, at rest a material could have the outward appearance of scattered blue dots on a white background. As force is applied to the material and particular layers move relative to each other, certain of the blue dots may become blocked by the overlying layers thereby exposing red dots through the gaps of the overlying layers.

Figure 4:
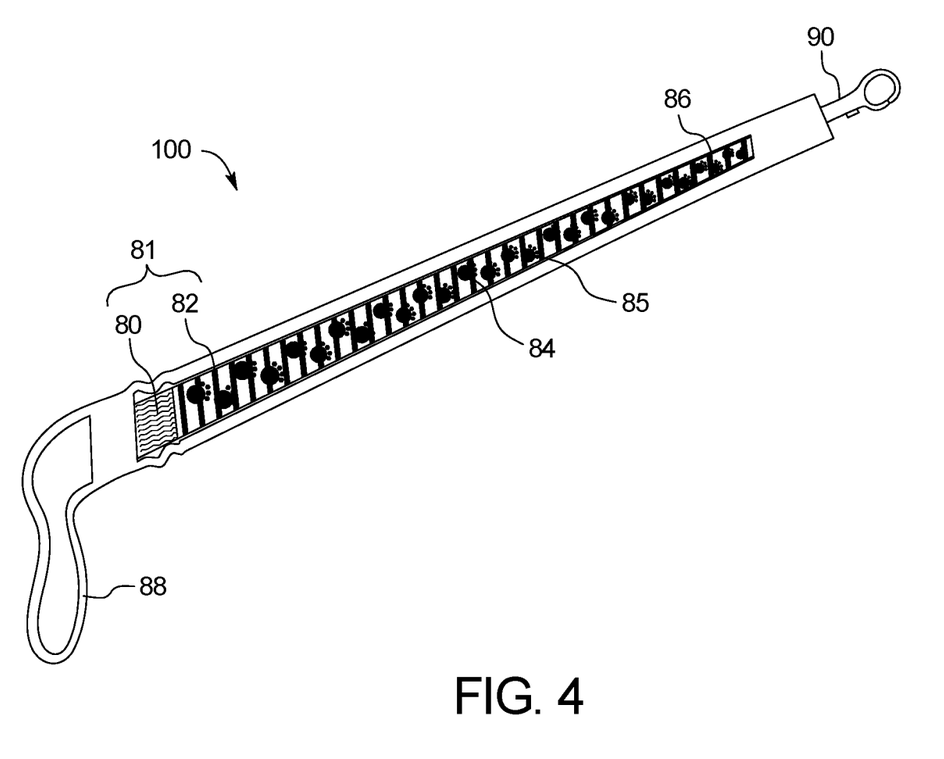
FIG. 4 is a perspective view of an example of a dog leash including the multi-layer system.
Figure 5:
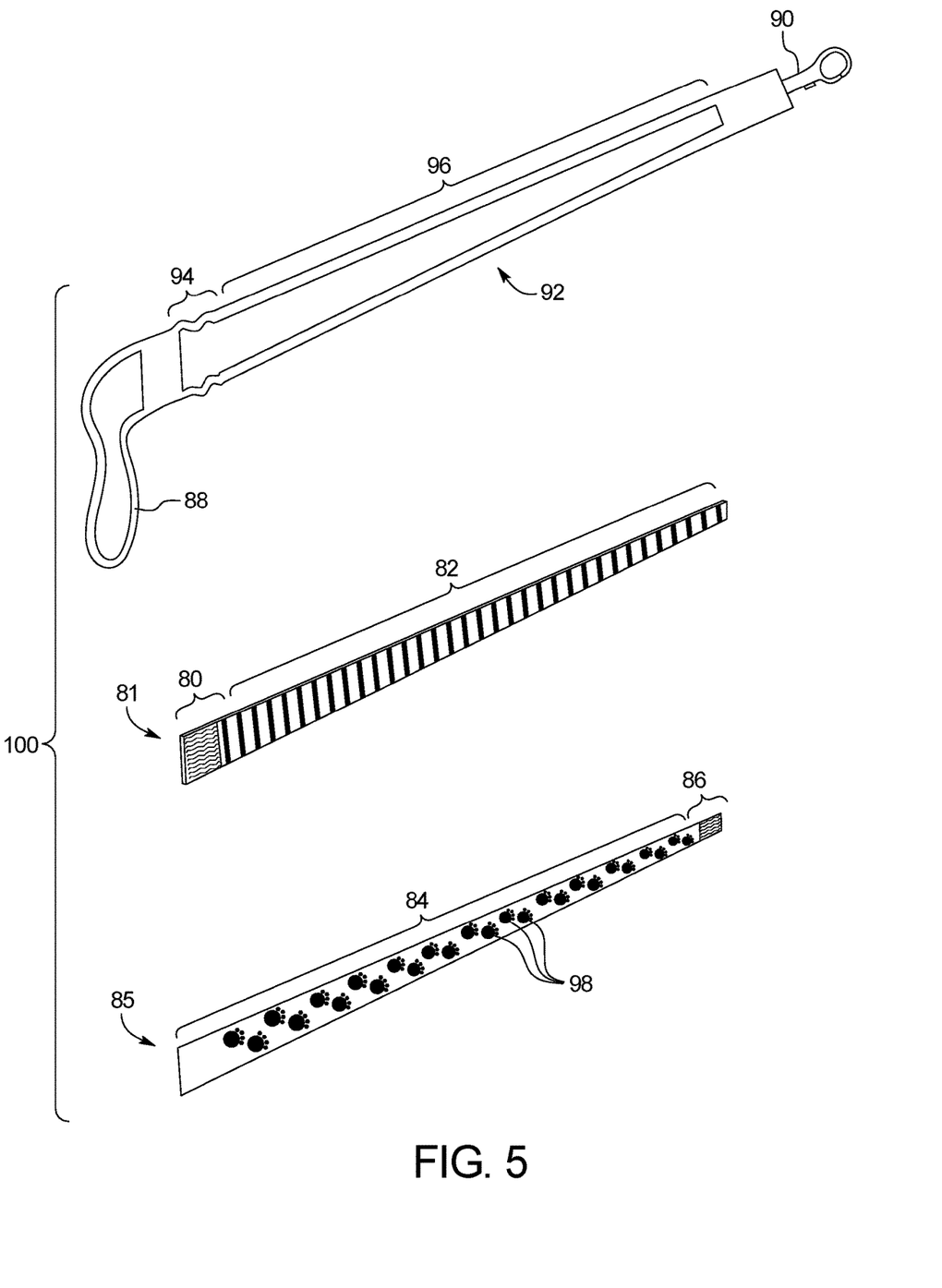
FIG. 5 is an exploded view of an example of a dog leash including the multi-layer system.
Figure 6A:
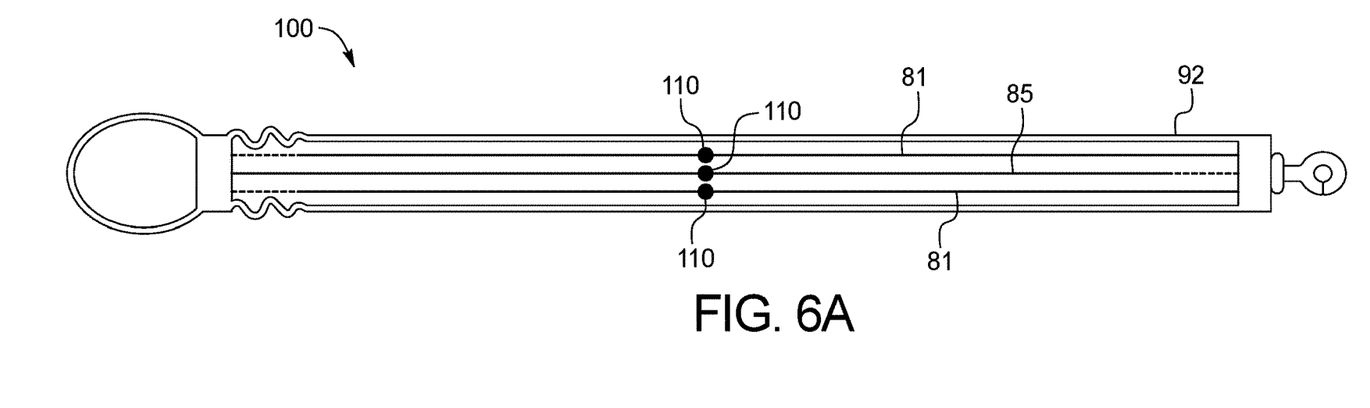
FIG. 6A is a side view of an example of a dog leash including the multi-layer system at rest.
Figure 6B:
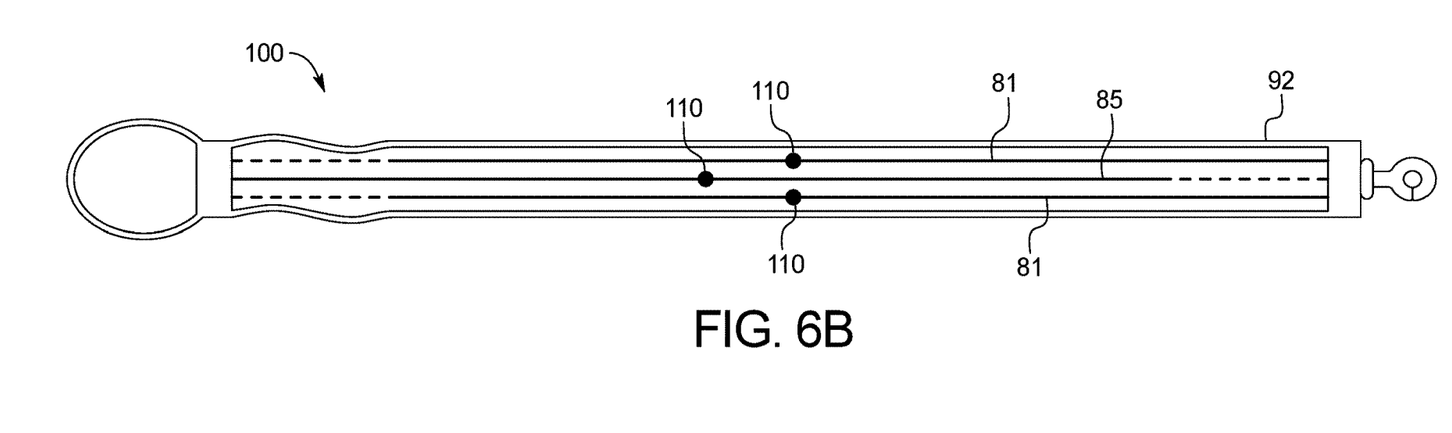
FIG. 6B is a side view of an example of a dog leash including the multi-layer system under force.
Figure 7A:
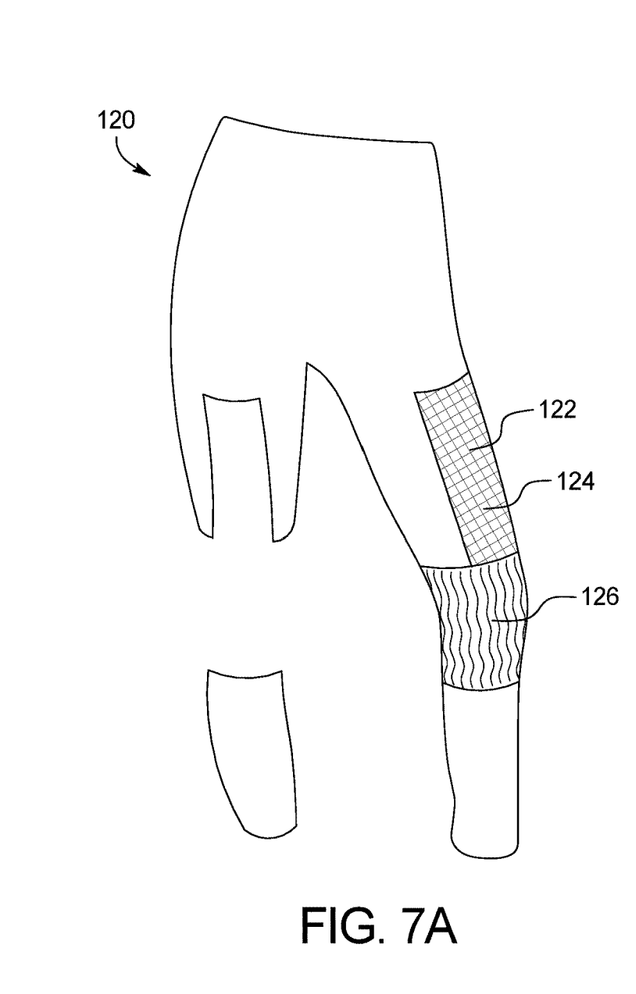
FIG. 7A is a perspective view of an example of an athletic apparel including the multi-layer system.
Figure 7B:
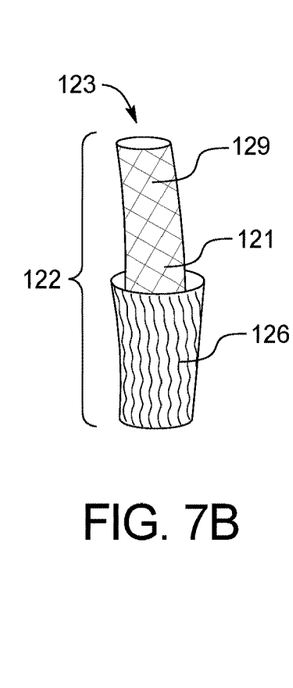
FIGS. 7B-7D are exploded views of the multi-layered system used in the athletic apparel.
Figure 7C:
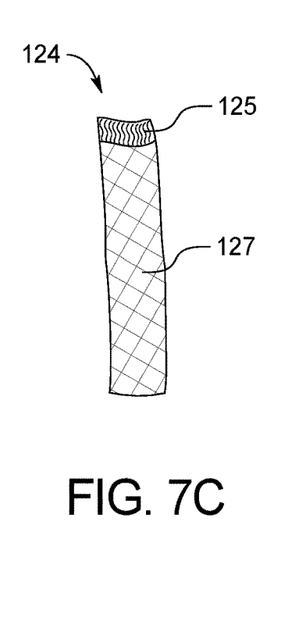
Figure 7D:
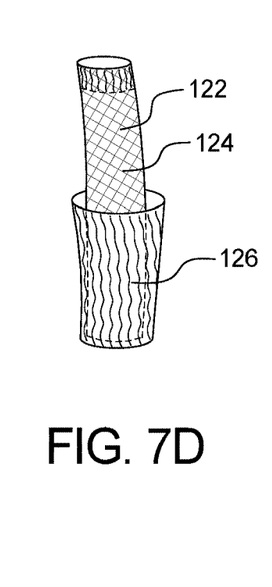

As shown in FIGS. 4-6, in an example, the material layers can be used in a dog leash 100, wherein at least one outer layer comprised of a first short proximal segment comprised of elastic material joined to a second distal segment of rigid fabric or polyvinyl-chloride sheeting with alternating black crosswise stripes and that includes open crosswise striped-shaped holes or transparencies which are joined together at their medial ends. The two outer layers 81 can be sewn together along their two long edges. At the proximal end of the material a first segment 80 strip of elastic material is attached to a leash handle 88 composed of a third non-distensible material, and at the distal end the rigid material can be attached to a latch for a dog collar. Enclosed by the two outer layers of fabric can be a third inner layer 85 of fabric composed of a rigid strip of fabric (e.g., a first segment 84 of the inner layer 85) at the proximal end and a short elastic strip of fabric (e.g., a second segment 86 of the inner layer 85) at the distal end which are joined together at their medial ends. At the proximal end of the rigid portion can be attached to the leash handle 88 and, and the distal end of the elastic portion can be attached to the latch 90. Printed along the length of the inner layer 85 can be a repeated five-way split image of walking dog paws in the style of a barrier-grid animation. As the user walks the dog, tension increases and decreases across the length of the leash that leads to several centimeters of relative movement between the inner layer and the outer layers. This produces an outward visual effect of a five-frame animation of walking dog paws along the length of the leash.

FIG. 5 includes an exploded view of the dog leash outer frame 92, the outer layers 81, and inner layer 85. The outer frame 92 can include a flexible segment 94 in the weight bearing frame at the proximal end near the handle 88 and a rigid nylon weight bearing frame 96 extending to the leash latch 90. The outer layers 81 can include a right side and left side that can be different or identical. The outer layers 81 can include holes or transparent gaps of 0.5 mm and stitched or printed black bars of 2.5 mm. The proximal portion of the outer layer includes an elastic segment joined to a long distal rigid segment of material. The inner layer is comprised of a long rigid proximal piece of material with a short distal elastic portion. The inner layer 85 can include any design, including, but not limited to, paws 98 as shown.

As shown in FIGS. 6A-6B, as mechanical force is applied along the length of the dog leash 100, relative points 100 become no longer aligned, thus allowing for visualization of the relative point 100 in the inner layer 85. As a result, different visual effects are achieved with and without mechanical force.

In an example, the dog leash 100 construction can include thin material attached along their lengthwise seams, wherein the short proximal portion is comprised of an elastic material while the remainder is rigid clear vinyl. The outer layers 81 can be printed symmetrically on both sides with opaque vertical lines with a 0.5 mm translucent gap after every 2.5 mm opaque line. Within these outer layers 81 is a single layer of material of equal length with the short distal portion comprised of an elastic material and the remainder comprised of minimally elastic polyester, the polyester can be printed with a repeated five-frame barrier-grid animation image (e.g., a simple animation of walking dog paws). The free ends of both outer layers 81 and the inner layer 85 are attached to a single thick woven nylon or other rigid leash material that forms a handle at the proximal end and terminates in a metal latch on the distal end. The lengthwise edges of the outer layer 81 can have an attached thick woven nylon or other rigid leash material to provide weight bearing. The proximal end of the weight bearing fabric is bunched with an interior elastic element that runs the same length at the elastic portion of the outer layer and may extend by up to 1 cm before the weight bearing material is pulled fully rigid and can no longer be deformed. The user can attach the leash 100 to a pet for a walk and as the animal pulls away from and then returns back towards the walker, the tensile force is produced and released along the length of the leash. This produces relative motion between outer layers 81 and inner layers 85 as the anti-parallel elastic layers extend and contract. This results in an outward appearance of the leash of five-frame animation of walking dog paws that coincides with the pull and release of the leash.

As shown in FIGS. 7A-7D, the layered materials can be used in apparel 120, e.g., form fitting apparel. For example, the material can be used in workout attire like leggings or tops. A first unit 122 of specialized mesh fabric includes a first segment 129 including a first large minimally elastic proximal portion 123 and a first significantly elastic distal portion 121 with each portion comprised of an inner and outer layer. Alternatively, or in addition to, the first segment 129 can include two layers of material that are stitched together along the length of the material to form a cylinder. In an example, the first segment 129 does not include the elastic distal portion 121.

The first unit 122 can be incorporated into the legging from the proximal knee to the mid-thigh. The first unit 122 can include a second elastic portion 126 that can extend below the knee and spans the circumference of the knee joining back on itself. The second elastic portion 126 can be composed of a single elastic fabric of a second type (i.e., different from the first segment 129). In an example, the second elastic portion 126 can be composed of two layers of material stitched along their circumferential edges (except for the small anterior portion where is meets segment one).

A second unit 124 of fabric can be inserted between inner and outer layers of the first unit and can include a second minimally elastic distal portion 127 and a second significantly elastic proximal portion 125.

The first unit 122 and second unit 124 can possess complementary colored Moiré patterns. When the lower limb is flexed and extended during running, squatting, or other physical activity, tension is applied across the multi-layered fabric piece along the length of the limb resulting in relative movement between the two layers. This can produce a resulting outward visual effect of colored diamonds traveling up and down the thigh as the wearer flexes and extends their lower limbs during the activity.

In an example, the first unit 122 of material can be an outer and inner layer and the second unit 124 can be a middle layer that lie on the anterior thigh. The outer and inner layers 123 can be approximately 3 inches by 8 inches and are joined along their long edges. The inner layer can be formed from a minimally elastic colored fabric, the outer layer can be formed from a minimally elastic fabric woven in a grid pattern with periodic gaps in a precise pattern. Just above the knee, the first segment 129 and second portion 126 of the first unit join together. The elastic modulus of the second segment 126 can be different than that of the first segment 129. For example, in the first unit the first segment 129 can have an elastic modulus of 2X, 10X, 200X, etc., wherein the second segment 126 can have an elastic modulus of X. Similarly, the second unit 124 can include at least two portions of different elasticities. For example, a first portion 125 can have an elastic modulus of X and a second portion 127 can have an elastic modulus of 2X, 10X, 200X, etc.

The second segment of the second unit 127 can be formed from woven fabric with periodic gaps in a precise pattern. The second unit 124 can lie within the inner and outer layers of the first unit 122.

The multi-layered fabric panel replaces the corresponding parts of a traditional legging, but the remainder of the garment can include traditional legging design. All of the free edges of the first unit can be joined to the corresponding edges of the leggings as well as the proximal and distal end of the second unit.

In an example, when the lower limb is flexed and extended during running, squatting, or other physical activity, tension can be applied across the multi-layered fabric piece along the length of the limb resulting in relative movement between the first unit and second unit. The constructive and destructive interference patterns between the outer layer of the first piece and second piece can produce aesthetically interesting dynamic patterns across the thighs that change with the wearer's actions.

Figure 8A:
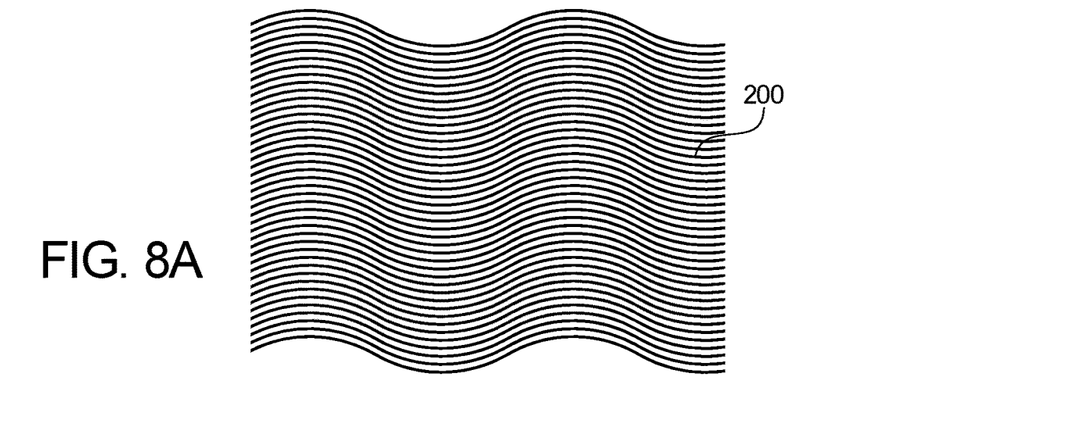
FIGS. 8A-8C are examples of grid patterns and overlapping grid patterns.
Figure 8B:
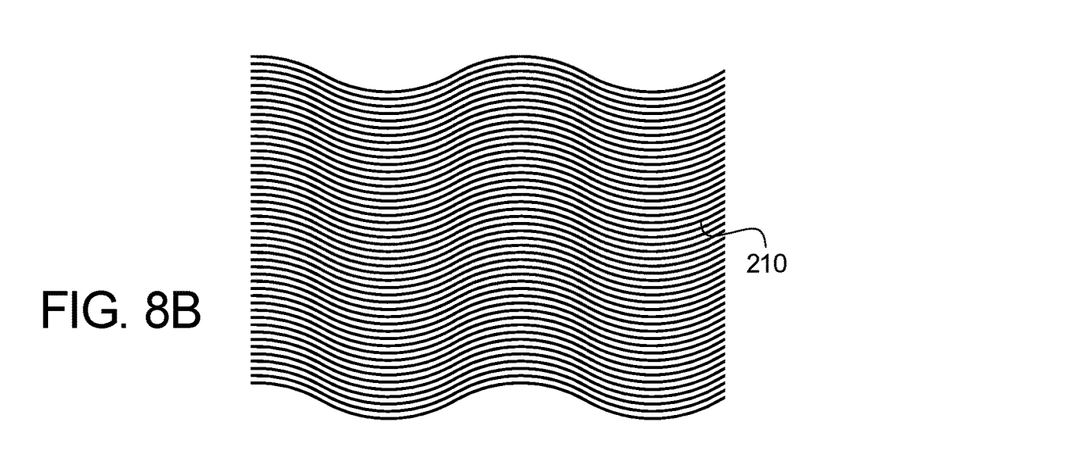
Figure 8C:
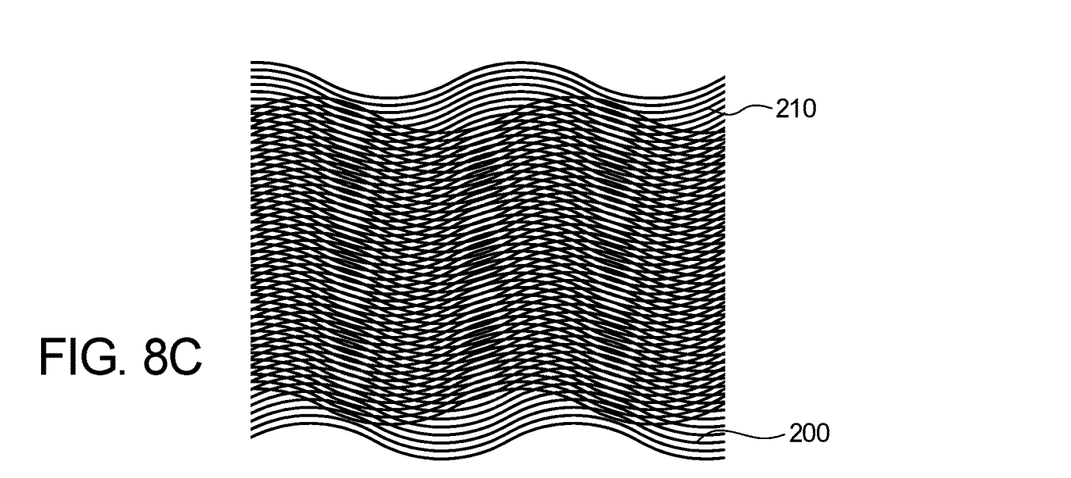

FIGS. 8A-8C depict an example of overlapping grid patterns from a first segment 122 and second segment 124.

Although the disclosure discusses fabric, the invention is not limited to fabrics. For example, various materials can be used with different elastic properties including but not limited to plastic, paper, rubber, or metal. Additionally, the mechanism of relative movement between thin material layer is not limited solely to the use of elastic materials and may be achieved by other chemical or mechanical means. The arrangement of elastic elements in the material can include more than one anticipated vector of mechanical force and thus elicit relative movement among the layers in multiple directions.

The system can be used in construction of other goods and products including, but not limited to, apparel, shirts, athletic sleeves, tights, pants, stockings, compression socks, compression sleeves, shoes, gloves, belts, pens, trampolines, inflatables, exercise bands, and/or product packaging.

It should be noted that various changes and modifications to the embodiments described herein will be apparent to those skilled in the art. Such changes and modifications may be made without departing from the spirit and scope of the present invention and without diminishing its attendant advantages. For example, various embodiments of the systems and methods may be provided based on various combinations of the features and functions from the subject matter provided herein.

I claim:

1. A multi-layer system comprising:
    a first layer of material including an outer side and an inner side and a first layer first edge and a first layer second edge on opposing sides of the first layer of material;
    a second layer of material adjacent to the inner side of the first layer of material, the second layer of material including a second layer first edge and a second layer second edge on opposing sides of the second layer of material;
    the first layer first edge is connected to the second layer first edge and the first layer second edge is connected to the second layer second edge;

when in a first configuration, a plurality of first portions of the second layer of material is partially visible through first layer of material and partially obscured by the first layer of material when viewed through the outer side of the first layer of material, wherein the plurality of first portions of the second layer of material visible through the first layer in the first configuration forms a first visual pattern;

in response to a tensile force applied along a first axis defined by a line spanning the first layer first edge and the first layer second edge, the first layer and the second layer move relative to each other from the first configuration to a second configuration, wherein the first layer includes a first outer segment and a second outer segment, wherein the first outer segment is a first elastic portion and the second outer segment is a rigid portion, wherein the rigid portion includes a plurality of apertures; and a plurality of second portions of the second layer of material are visible through the first layer of material when in the second configuration, wherein the plurality of second portions of the second layer of material visible through the first layer in the first configuration forms a second visual pattern, wherein the second visual pattern is different than the first visual pattern;

wherein when in the second configuration, at least a portion of the first portions of the second layer of material are not visible through the first layer;

wherein the second layer of material includes at least a first inner segment and a second inner segment, wherein the first inner segment is an elastic portion and the second inner segment is a rigid portion, wherein the first outer segment and the second outer segment have a non-identical arrangement with the first inner segment and the second inner segment.

2. The multi-layer system of claim 1 wherein the first layer of material includes a third segment, wherein the third segment is a second elastic portion.

3. The multi-layer system of claim 1 further comprising
a third layer of material including a third outer side and a third inner side and a third layer first edge and a third layer second edge on opposing sides of the third layer of material;
a fourth layer of material adjacent to the third inner side of the third layer of material, the fourth layer of material including a fourth layer first edge and a fourth layer second edge on opposing sides of the fourth layer of material;
the third layer first edge is connected to the fourth layer first edge and the third layer second edge is connected to the fourth layer second edge,
wherein the third layer first edge and fourth layer first edge are connected to the first layer second edge and the second layer second edge,
wherein the third layer includes a third elastic portion and a third rigid portion, wherein the third rigid portion includes a plurality of apertures.

4. The multi-layer system of claim 1, further comprising a third layer of material including a third layer first edge and a third layer second edge on opposing sides of the third layer of material, wherein third first layer first edge is connected to the first and second layer first edges and the third layer second edge is connected to the first and second layer second edges.

5. The multi-layer system of claim 4, wherein the first layer includes a first layer third edge and a first layer fourth edge on opposing sides of the first layer of material, wherein the second layer includes a second layer third edge and a second layer fourth edge on opposing sides of the second layer of material, wherein the third layer includes a third layer third edge and a third layer fourth edge on opposing sides of the first layer of material, wherein at least two of the first layer third edge, second layer third edge, and third layer third edge are attached, and wherein at least two of the first layer fourth edge, second layer fourth edge, and third layer fourth edge are attached.

6. A multi-layer system comprising:
an outer layer including a first outer layer segment and a second outer layer segment, wherein the first outer layer segment has an elasticity less than the second outer layer segment, wherein the first outer layer segment has a plurality of apertures; and an inner layer including a first inner layer segment and a second inner layer segment, wherein the first inner layer segment has a different elasticity than the second inner layer segment, wherein the first outer layer segment and the second outer layer segment have a non-identical arrangement with the first inner layer segment and the second inner layer segment, wherein upon application of a mechanical force on the multilayer system, the outer layer and inner layer move relative to one another from a resting state to an extended state, wherein in the resting state a plurality of first portions of the inner layer is visible through the outer layer forming a first visual pattern, and wherein in the resting state a plurality of second portions of the inner layer are not visible through the outer layer, wherein in the extended state the plurality of second portions of the inner layer are visible through the outer layer forming a second visual pattern, wherein in the extended state at least a portion of the plurality of first portions of the inner layer is not visible through the outer layer.

7. The system of claim 6, wherein the multilayer system includes a first end and a second end, wherein the inner layer and the outer layer extend from the first end to the second end, wherein the first outer layer segment connects to the first end, wherein the second outer layer segment connects to the second end, wherein the second inner layer segment connects to the second end, wherein the first inner layer segment connects to the first end.

8. The system of claim 6, wherein the first inner layer segment is attached to the second inner layer segment, wherein the first outer layer segment is attached to the second outer layer segment.

9. The system of claim 6, wherein the first inner layer segment has a different elasticity than the first outer layer segment.

10. The system of claim 6, wherein in the resting state an inner layer midpoint of the inner layer is aligned with an outer layer midpoint of the outer layer, wherein in the extended state the inner layer midpoint of the inner layer is not aligned with the outer layer midpoint of the outer layer.

11. The system of claim 6, wherein in the extended state an inner layer midpoint of the inner layer is aligned with an outer layer midpoint of the outer layer, wherein in the resting state the inner layer midpoint of the inner layer is not aligned with the outer layer midpoint of the outer layer.

12. The system of claim 6, wherein the multi-layer system is a dog leash, clothing, footwear, glove, belt, strap, shoelace, drawstring, cord, rope, elastic band, trampoline, or inflatable toy.

13. The system of claim 6, wherein the outer layer and the inner layer are cylindrical, wherein the inner layer is positioned inside the outer layer.

14. The system of claim 6, wherein the multi-layer system is apparel, wherein when a user's extremity is in the extended state the multi-layer system is in the resting state, wherein when the user's extremity is in a bent state the multi-layer system is in the extended state.

15. The system of claim 6, wherein the outer layer includes a first print pattern, wherein the inner layer includes a second print pattern, wherein an overlay of the first pattern and second pattern produce a third pattern, wherein in the resting state the third pattern is different than the third pattern in the extended state.

16. The system of claim 15, wherein the third pattern in the extended state includes visible text.

17. The system of claim 15, wherein the third pattern in the extended state includes a visible animation.

18. A multi-layer system comprising:
an outer layer including a first outer layer segment and a second outer layer segment, wherein the first outer layer segment has an elasticity less than the second outer layer segment, wherein the first outer layer segment has a plurality of apertures; and
an inner layer including a first inner layer segment and a second inner layer segment, wherein the first inner layer segment has a different elasticity than the second inner layer segment,
wherein upon application of a mechanical force on the multilayer system, the outer layer and inner layer move relative to one another from a resting state to an extended state,
wherein in the resting state a plurality of first portions of the inner layer is visible through the outer layer forming a first visual pattern, and wherein in the resting state a plurality of second portions of the inner layer are not visible through the outer layer,
wherein in the extended state the plurality of second portions of the inner layer are visible through the outer layer forming a second visual pattern, wherein in the extended state at least a portion of the plurality of first portions of the inner layer is not visible through the outer layer.

19. The multi-layer system of claim 18, wherein the first outer layer segment and the second outer layer segment have an identical arrangement with the first inner layer segment and the second inner layer segment, and
wherein at least one pair of the first and second outer layer segments and the first and the second inner layer segments have different elasticities.

20. A multi-layer system comprising:
a first layer of material including an outer side and an inner side and a first layer first edge and a first layer second edge on opposing sides of the first layer of material;
a second layer of material adjacent to the inner side of the first layer of material, the second layer of material including a second layer first edge and a second layer second edge on opposing sides of the second layer of material;
the first layer first edge is connected to the second layer first edge and the first layer second edge is connected to the second layer second edge;
when in a first configuration, a plurality of first portions of the second layer of material is partially visible through first layer of material and partially obscured by the first layer of material when viewed through the outer side of the first layer of material, wherein the plurality of first portions of the second layer of material visible through the first layer in the first configuration forms a first visual pattern;
in response to a tensile force applied along a first axis defined by a line spanning the first layer first edge and the first layer second edge, the first layer and the second layer move relative to each other from the first configuration to a second configuration,
wherein the first layer includes a first outer segment and a second outer segment, wherein the first outer segment is a first elastic portion and the second outer segment is a rigid portion, wherein the rigid portion includes a plurality of apertures; and
a plurality of second portions of the second layer of material are visible through the first layer of material when in the second configuration, wherein the plurality of second portions of the second layer of material visible through the first layer in the first configuration forms a second visual pattern, wherein the second visual pattern is different than the first visual pattern;
a third layer of material including a third outer side and a third inner side and a third layer first edge and a third layer second edge on opposing sides of the third layer of material;
a fourth layer of material adjacent to the third inner side of the third layer of material, the fourth layer of material including a fourth layer first edge and a fourth layer second edge on opposing sides of the fourth layer of material;
the third layer first edge is connected to the fourth layer first edge and the third layer second edge is connected to the fourth layer second edge,
wherein the third layer first edge and fourth layer first edge are connected to the first layer second edge and the second layer second edge,
wherein the third layer includes a third elastic portion and a third rigid portion, wherein the third rigid portion includes a plurality of apertures.

21. The multi-layer system of claim 20, further comprising a third layer of material including a third layer first edge and a third layer second edge on opposing sides of the third layer of material, wherein third first layer first edge is connected to the first and second layer first edges and the third layer second edge is connected to the first and second layer second edges.

22. The multi-layer system of claim 21, wherein the first layer includes a first layer third edge and a first layer fourth edge on opposing sides of the first layer of material,
wherein the second layer includes a second layer third edge and a second layer fourth edge on opposing sides of the second layer of material,
wherein the third layer includes a third layer third edge and a third layer fourth edge on opposing sides of the first layer of material,
wherein at least two of the first layer third edge, second layer third edge, and third layer third edge are attached, and
wherein at least two of the first layer fourth edge, second layer fourth edge, and third layer fourth edge are attached.

* * * * *